US 11,453,435 B2

(12) United States Patent
Niwa et al.

(10) Patent No.: US 11,453,435 B2
(45) Date of Patent: Sep. 27, 2022

(54) VEHICLE CONTROL APPARATUS (71) Applicant: JTEKT CORPORATION, Osaka (JP)

(72) Inventors: Tomohiro Niwa, Okazaki (JP); Satoru Mikamo, Okazaki (JP); Masashi Fuji, Toyota (JP)

(73) Assignee: JTEKT CORPORATION, Kariya (JP)

( * ) Notice: Subject to any disclaimer, the term of this patent is extended or adjusted under 35 U.S.C. 154(b) by 554 days.

(21) Appl. No.: 16/553,792

(22) Filed: Aug. 28, 2019

(65) Prior Publication Data

US 2020/0070874 A1    Mar. 5, 2020

(30) Foreign Application Priority Data

Sep. 3, 2018   (JP) .............................. JP2018-164639

(51) Int. Cl.
*B62D 5/04*       (2006.01)
*H02P 1/02*       (2006.01)
*H02P 27/00*      (2006.01)
*H02P 1/24*       (2006.01)

(52) U.S. Cl.
CPC .......... *B62D 5/0481* (2013.01); *B62D 5/0463* (2013.01); *H02P 1/022* (2013.01); *H02P 1/24* (2013.01); *H02P 27/00* (2013.01)

(58) Field of Classification Search
CPC ........... B62D 5/0481; B62D 6/00; H02P 7/00; H02P 1/24; H02P 27/00; H02P 29/00; G01R 31/00; H01H 47/002
See application file for complete search history.

(56) References Cited

U.S. PATENT DOCUMENTS

| | | | |
|---|---|---|---|
| 2004/0047097 | A1* | 3/2004 | Thomas Jordan . G01R 31/3278 361/92 |
| 2013/0335100 | A1* | 12/2013 | Boehm ................. G01R 35/00 324/537 |
| 2016/0229444 | A1 | 8/2016 | Toda et al. |
| 2018/0238935 | A1 | 8/2018 | Nakashima et al. |

FOREIGN PATENT DOCUMENTS

| | | |
|---|---|---|
| GB | 2392990 A | 3/2004 |
| JP | 2006-022662 A | 1/2006 |
| JP | 2006-217694 A | 8/2006 |

(Continued)

OTHER PUBLICATIONS

Jan. 16, 2020 European Search Report issued in European Patent Application No. 19194537.7.

(Continued)

*Primary Examiner* — Said Bouziane
(74) *Attorney, Agent, or Firm* — Oliff PLC (57) ABSTRACT

A vehicle control apparatus capable of protecting a pre-charge circuit is provided. When a voltage has entered an operating voltage range, a microcomputer determines whether a preset period has elapsed from then. Upon determining that the preset period has elapsed, the microcomputer starts initial check. To carry out the initial check, the microcomputer starts charging a capacitor for power supply stabilization of a drive circuit by turning on the pre-charge circuit and, when the charging of the capacitor is completed, turns on a power supply relay provided on a power supply line that connects between a battery and the drive circuit.

5 Claims, 6 Drawing Sheets

(56) References Cited

FOREIGN PATENT DOCUMENTS

| | | |
|---|---|---|
| JP | 2006-262586 A | 9/2006 |
| JP | 2007-276706 A | 10/2007 |
| JP | 2008-059516 A | 3/2008 |
| JP | 2008-154422 A | 7/2008 |
| JP | 2010-193663 A | 9/2010 |
| JP | 6109332 B2 | 4/2017 |
| JP | 2018-137944 A | 8/2018 |

OTHER PUBLICATIONS

Jun. 21, 2022 Office Action issued in Japanese Patent Application No. 2018-164639.

* cited by examiner

VEHICLE CONTROL APPARATUS

INCORPORATION BY REFERENCE

The disclosure of Japanese Patent Application No. 2018-164639 filed on Sep. 3, 2018 including the specification, drawings and abstract, is incorporated herein by reference in its entirety.

BACKGROUND OF THE INVENTION

1. Field of the Invention

The invention relates to a vehicle control apparatus.

2. Description of Related Art

A control apparatus that controls a motor that is a source of an assist torque applied to a steering mechanism of a vehicle is conventionally known. For example, a control apparatus disclosed in Japanese Unexamined Patent Application Publication No. 2007-276706 (JP 2007-276706 A) includes a drive circuit, a power supply relay, and a control circuit. The drive circuit converts direct current (DC) power supplied from a battery into alternating current (AC) power and supplies the converted AC power to a motor. The power supply relay opens and closes a power supply path between the battery and the drive circuit. The control circuit controls operations of the drive circuit and the power supply relay. A capacitor for power supply stabilization is provided for the drive circuit.

The control circuit switches the power supply relay to on from off when triggered by turn-on of a power switch, e.g., an ignition switch. At this time, if an amount of power stored in the capacitor is small, inrush current into the capacitor from the battery may occur. A pre-charge circuit is provided in the control apparatus to reduce occurrence of the inrush current. The pre-charge circuit is a circuit for charging the capacitor before switching the power supply relay to on from off. The control circuit charges (pre-charges) the capacitor through the pre-charge circuit in advance and thereafter switches the power supply relay to on from off.

A control circuit that carries out what is generally referred to as initial check when power is turned on by operating a power switch is described in Japanese Patent No. 6109332 (JP 6109332 B), for example. The initial check is a check prior to starting power supply to the motor and is inspection for anomalies in parts, e.g., windings of the motor and the drive circuit, for driving the motor. When no anomaly is detected in the parts for driving the motor, the control circuit supplies power to the motor through the drive circuit. However, when an anomaly is detected in one of the parts for driving the motors, the control circuit may cause the abnormal part not to be used or shut off power supply, for example, depending on a type of the anomaly.

An operating voltage range may be set for the control circuit. The operating voltage range is a range of voltage within which the control circuit is guaranteed to operate in specifications. When a power supply voltage has entered the operating voltage range from outside the operating voltage range, the control circuit starts operating to carry out the initial check, for example, triggered by the change.

In a vehicle with an engine, for example, a drop in battery voltage may make it difficult to supply required power to an electrical load, such as a starter for starting the engine. In such a situation, what is generally referred to as jump start may be performed. Jump start means starting an engine of a disabled vehicle by connecting a battery of a rescue vehicle and a battery of the disabled vehicle with a jumper cable and supplying rescuing power to a starter of the disabled vehicle from the battery of the rescue vehicle. When the power switch of the disabled vehicle is turned off after the engine is started by the jump start, the following undesirable situation may arise. To perform the jump start, the battery of the disabled vehicle is connected to the battery of the rescue vehicle. As a result, a power supply voltage of the control circuit of the disabled vehicle may be held in an overvoltage condition where the power supply voltage is above the operating voltage range. When the power switch is turned off under the overvoltage condition, a power supply path between the battery and the control circuit is shut off, causing the power supply voltage of the control circuit to gradually decrease, eventually to a value below the operating voltage range. In this process, although for only a slight period of time, the power supply voltage stays within the operating voltage range by which an initial check start condition is satisfied.

There is some time lag from when the power switch is turned off to when the control circuit actually recognizes that the power switch is turned off. The control circuit recognizes that the power supply voltage is within the operating voltage range earlier than recognizing that the power switch is turned off. The control circuit then accordingly starts the initial check. The control circuit carries out the initial check by turning on the pre-charge circuit and, when triggered by completion of charging of the capacitor, turning on the power supply relay. As a result, power from the battery is supplied to a circuit downstream of the power supply relay. At this time, because the battery is connected to the battery of the rescue vehicle and therefore held in the overvoltage condition, a voltage above durable power of the pre-charge circuit may be applied to the pre-charge circuit.

SUMMARY OF THE INVENTION

An object of the invention is to provide a vehicle control apparatus capable of protecting a pre-charge circuit.

A vehicle control apparatus according to an aspect of the invention includes a drive circuit that supplies driving power based on a power supply voltage to a motor, a capacitor for power supply stabilization, the capacitor being connected in parallel with the drive circuit, a control circuit that controls an operation of the drive circuit, a power switch that opens and closes a first power supply path that connects between the control circuit and a power supply, a power supply relay that opens and closes a second power supply path that connects between the drive circuit and the power supply, and a pre-charge circuit that opens and closes a third power supply path that connects between the drive circuit and the power supply. After a lapse of a first preset period from when a voltage supplied through the first power supply path has entered an operating voltage range due to turning on of the power switch, the control circuit starts charging the capacitor by turning on the pre-charge circuit and, when the charging of the capacitor is completed, turns on the power supply relay.

By connecting the power supply of a disabled vehicle to a power supply of a rescue vehicle, for example, a power supply voltage of the control circuit of the disabled vehicle enters an overvoltage condition where the power supply voltage is above the operating voltage range. When the power switch of the disabled vehicle is turned off under the overvoltage condition, the first power supply path between the power supply and the control circuit is shut off, causing the power supply voltage of the control circuit to gradually decrease, eventually to a value within the operating voltage range. There is some time lag from when the power switch is turned off to when the control circuit actually recognizes that the power switch is turned off. Hence, the control circuit may recognize that the power supply voltage has entered the operating voltage range earlier than recognizing that the power switch is turned off. This may cause the control circuit to turn on the pre-charge circuit and, when triggered by completion of charging of the capacitor, to turn on the power supply relay. At this time, because the power supply of the disabled vehicle is connected to the power supply of the rescue vehicle and therefore the power supply voltage is held in the overvoltage condition, a voltage above durable power of the pre-charge circuit may be applied to the pre-charge circuit.

However, according to the above aspect, when the voltage supplied through the first power supply path has entered the operating voltage range, after the first preset period has elapsed from that time, the control circuit starts charging the capacitor by turning on the pre-charge circuit and, when charging of the capacitor is completed, turns on the power supply relay. Thus, even when the power switch is turned off under the overvoltage condition where the power supply voltage of the control circuit is above the operating voltage range and, as a result, the power supply voltage of the control circuit enters the operating voltage range, the control circuit does not turn on the pre-charge circuit immediately. If the power supply voltage of the control circuit decreases to a value below the operating voltage range before the first preset period elapses from when the power supply voltage of the control circuit has entered the operating voltage range, the control circuit does not turn on the pre-charge circuit. Furthermore, because the capacitor is not charged, the power supply relay is not turned on. Because no overvoltage is supplied to the pre-charge circuit, protecting the pre-charge circuit from an overvoltage is achieved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
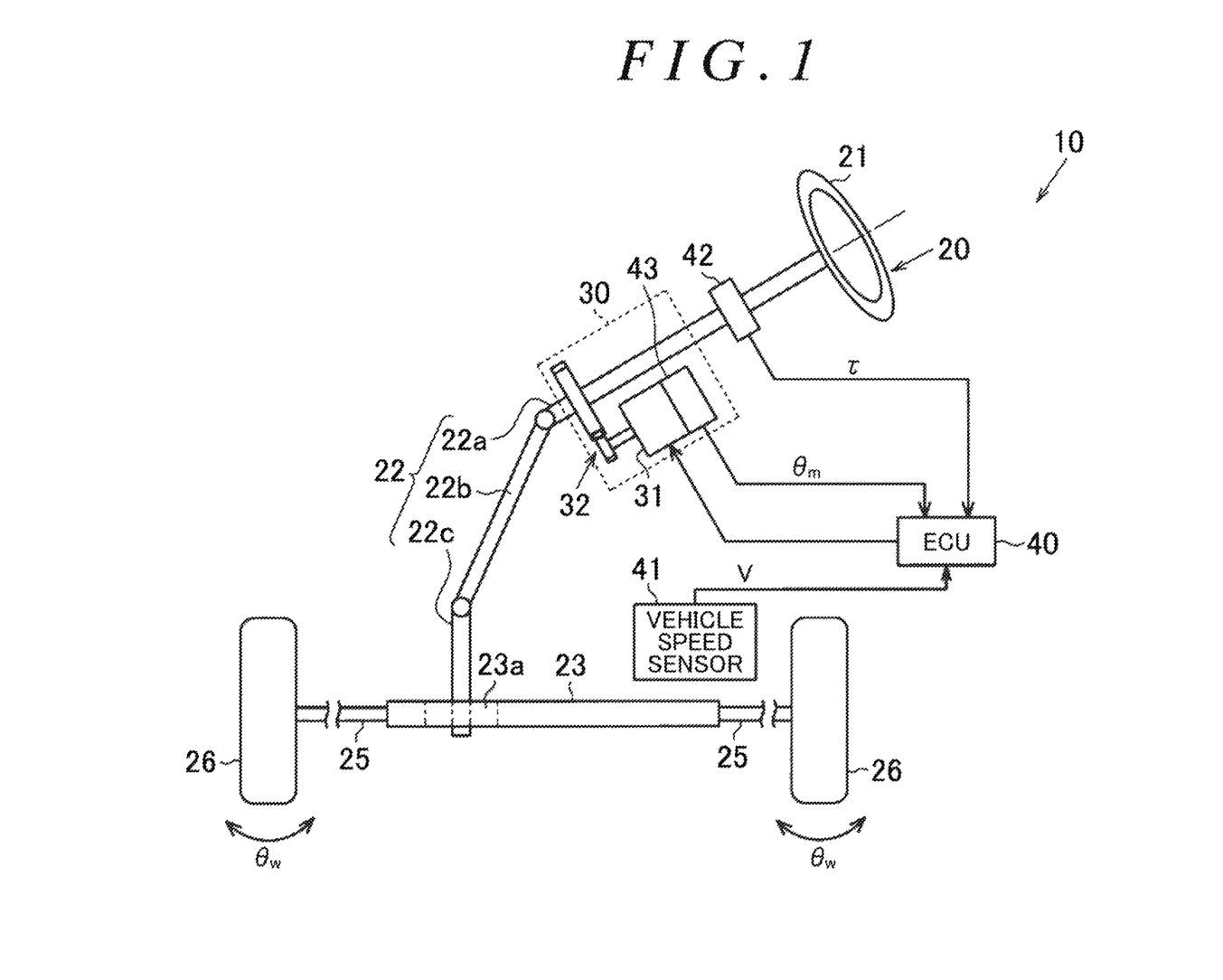
FIG. 1 is a diagram illustrating a schematic configuration of an electric power steering system where a vehicle control apparatus (ECU) according to a first embodiment of the invention is mounted.

A vehicle control apparatus according to a first embodiment of the invention embodied as a control apparatus of an electric power steering system (hereinafter referred to as "EPS") is described below. As illustrated in FIG. 1, an EPS 10 includes a steering mechanism 20 that turns steered wheels based on a driver's steering operation, a steering assist mechanism 30 that assists the driver's steering operation, and an electronic control unit (ECU) 40 that controls actuation of the steering assist mechanism 30.

The steering mechanism 20 includes a steering wheel 21 operated by a driver and a steering shaft 22 that rotates integrally with the steering wheel 21. The steering shaft 22 includes a column shaft 22a connected to the steering wheel 21, an intermediate shaft 22b connected to a lower end portion of the column shaft 22a, and a pinion shaft 22c connected to a lower end portion of the intermediate shaft 22b. A lower end portion of the pinion shaft 22c is meshed with a rack shaft 23 (more specifically, a portion 23a where a rack tooth is provided) extending in a direction intersecting the pinion shaft 22c. A rotary motion of the steering shaft 22 is converted into a reciprocating linear motion of the rack shaft 23 through meshing between the pinion shaft 22c and the rack shaft 23. The reciprocating linear motion is transmitted to a right steered wheel 26 and a left steered wheel 26 each via a corresponding one of tie rods 25 that are coupled to respective ends of the rack shaft 23. As a result, a steered angle $\theta_w$ of the steered wheels 26 is changed.

The steering assist mechanism 30 includes a motor 31 that is a source of a steering assist force (assist torque). A three-phase brushless motor may be employed as the motor 31, for example. The motor 31 is coupled to the column shaft 22a via a reduction mechanism 32. The reduction mechanism 32 reduces a speed of rotation of the motor 31 and transmits a rotary force of the reduced speed to the column shaft 22a. Thus, a torque of the motor 31 is applied to the steering shaft 22 as a steering assist force to assist a driver's steering operation.

The ECU 40 obtains detection results of various sensors provided in the vehicle as information (state variables) indicating a driver's demand, a driving state, and a steering state and controls the motor 31 in accordance with the obtained various information. Examples of the various sensors include a vehicle speed sensor 41, a torque sensor 42, and a rotation angle sensor 43. The vehicle speed sensor 41 detects a vehicle speed (driving speed of the vehicle) V. The torque sensor 42 is provided on the column shaft 22a. The torque sensor 42 detects a steering torque $\tau$ applied to the steering shaft 22. The rotation angle sensor 43 is provided on the motor 31. The rotation angle sensor 43 detects a rotation angle $\theta_m$ of the motor 31.

The ECU 40 performs vector control of the motor 31 using the rotation angle $\theta_m$ of the motor 31 detected through the rotation angle sensor 43. The ECU 40 performs assist control by calculating a target assist torque based on the steering torque $\tau$ and the vehicle speed V and supplying the motor 31 with driving power that causes the steering assist mechanism 30 to produce the calculated target assist torque.

Figure 2:
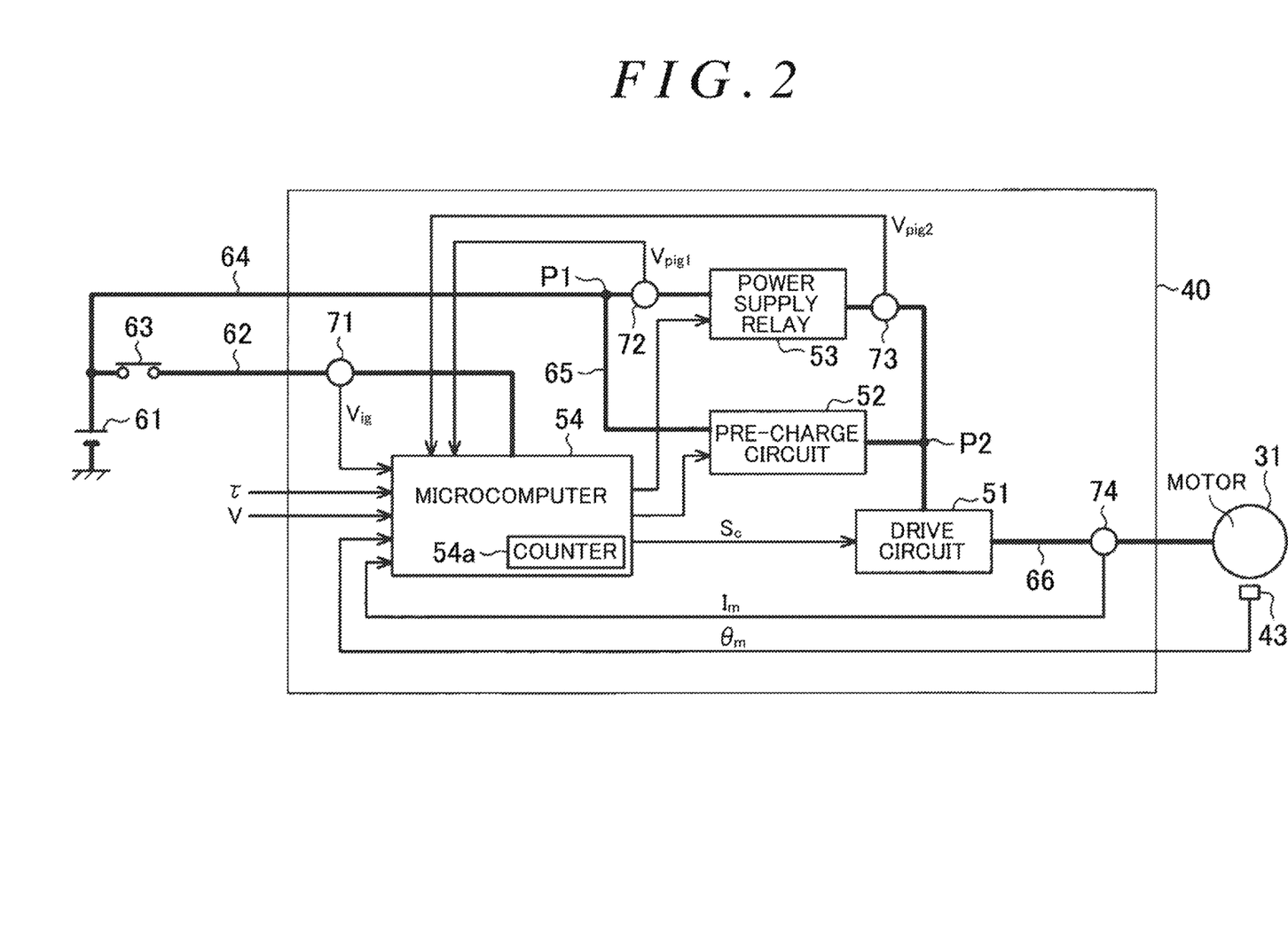
FIG. 2 is a block diagram illustrating the ECU according to the first embodiment.

The ECU 40 is described in detail below. As illustrated in FIG. 2, the ECU 40 includes a drive circuit 51, a pre-charge circuit 52, a power supply relay 53, and a microcomputer 54.

The microcomputer 54 is supplied with power from a battery 61 mounted in the vehicle. The battery 61 and the microcomputer 54 are connected via a power supply line 62. A power switch 63, such as an ignition switch, of the vehicle is provided on the power supply line 62. Electrical continuity of the power supply line 62 is switched on and off by operating the power switch 63. The power switch 63 is operated to actuate a drive source (e.g., an engine) for driving the vehicle. When the power switch 63 is turned on, power of the battery 61 is supplied to the microcomputer 54 via the power supply line 62.

The drive circuit 51 is also supplied with power from the battery 61. The battery 61 and the drive circuit 51 are connected via a power supply line 64. The power supply relay 53 is provided on the power supply line 64. The power supply relay 53 switches on and off electrical continuity of the power supply line 64 in accordance with a command from the microcomputer 54. When the power supply relay 53 is turned on, power of the battery 61 is supplied to the drive circuit 51 via the power supply line 64.

A junction P1 is provided on the power supply line 64 between the battery 61 and the power supply relay 53. A junction P2 is provided on the power supply line 64 between the power supply relay 53 and the drive circuit 51. The junction P1 and the junction P2 are connected via a power supply line 65. The pre-charge circuit 52 is provided on the power supply line 65. The pre-charge circuit 52 switches on and off electrical continuity of the power supply line 65 in accordance with a command from the microcomputer 54. When the pre-charge circuit 52 is turned on, power of the battery 61 is supplied to the drive circuit 51 via the power supply line 65. The drive circuit 51 and the motor 31 are connected via feeder paths 66 for three phases. The feeder paths 66 are constituted of bus bars or cables, for example.

A voltage sensor 71 is provided on the power supply line 62. The voltage sensor 71 detects a voltage $V_{ig}$ (IG voltage) on the power supply line 62 as a power supply voltage of the microcomputer 54.

Two voltage sensors 72 and 73 are provided on the power supply line 64. The voltage sensor 72 is provided on the power supply line 64 between the battery 61 and the power supply relay 53. The voltage sensor 73 is provided on the power supply line 64 between the power supply relay 53 and the drive circuit 51. The voltage sensor 72 detects a voltage $V_{pig1}$ (a first PIG voltage) on the power supply line 64 between the battery 61 and the power supply relay 53. The voltage sensor 73 detects a voltage $V_{pig2}$ (a second PIG voltage) on the power supply line 64 between the power supply relay 53 and the drive circuit 51. A current sensor 74 is provided on the feeder paths 66. The current sensor 74 detects a current $I_m$, of each phase supplied from the drive circuit 51 to the motor 31.

Figures 3, 4:
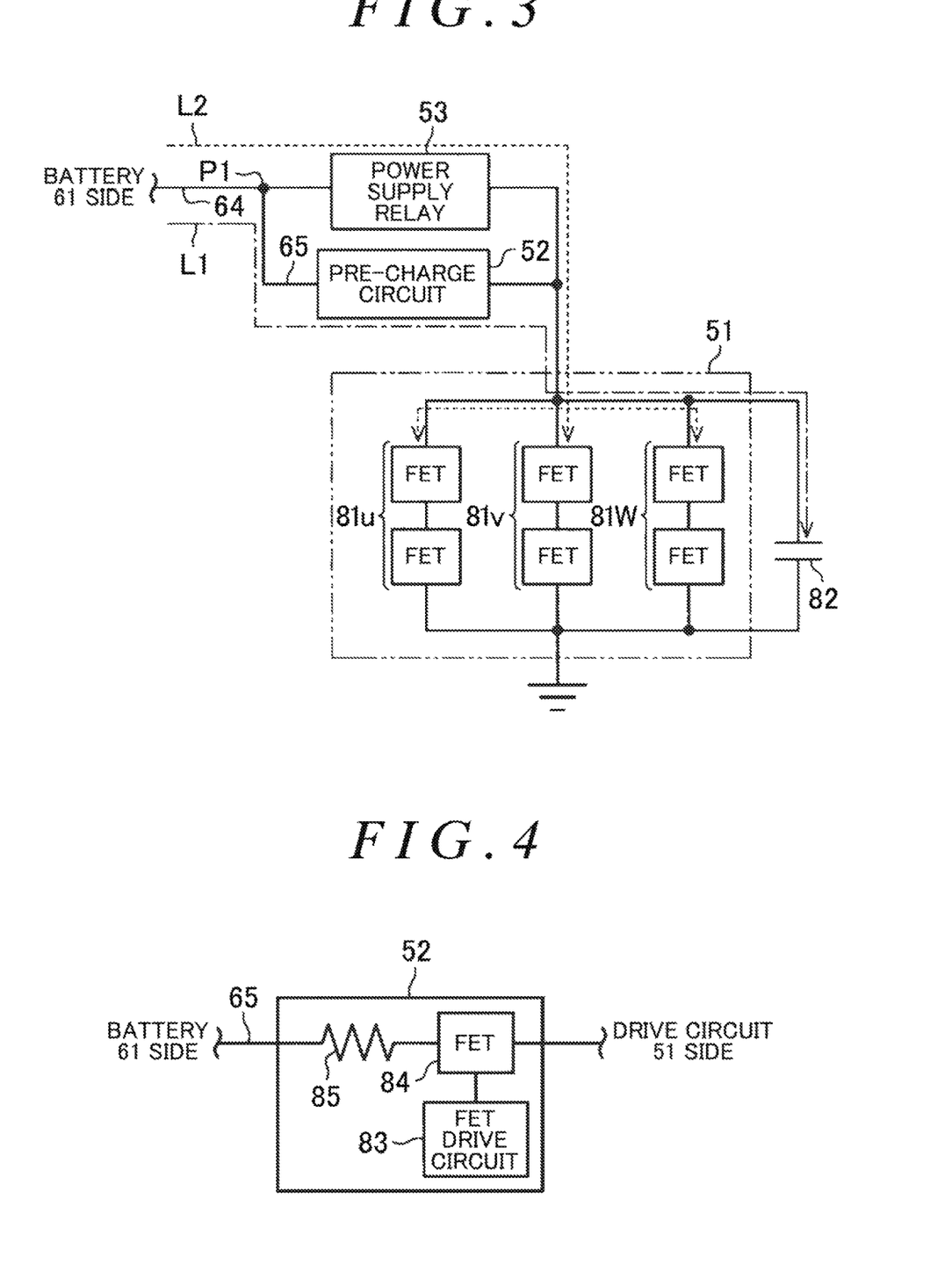
FIG. 3 is a block diagram illustrating a drive circuit according to the first embodiment.
FIG. 4 is a block diagram illustrating a pre-charge circuit according to the first embodiment.

As illustrated in FIG. 3, the drive circuit 51 is a pulse width modulation (PWM) inverter formed by connecting three legs 81$u$, 81$v$, and 81$w$ in parallel. Each leg that is a basic unit is a switching device, such as series-connected two field-effect transistors (FETs), and corresponds to one of the three phases (U, V, and W). The drive circuit 51 converts direct current (DC) power supplied from the battery 61 into three-phase alternating current (AC) power such that the switching device (the FETs) of each of the three phases performs a switching operation based on a command signal $S_c$ generated by the microcomputer 54. The three-phase AC power generated by the drive circuit 51 is supplied to the motor 31 via the feeder paths 66 (omitted from FIG. 3 for clarity) for the three phases.

A capacitor 82 for power supply stabilization is provided for the drive circuit 51. The capacitor 82 is connected in parallel with the parallel-connected three legs 81$u$, 81$v$, and 81$w$. The capacitor 82 stores electric charge. In case of shortage of power to be supplied to the drive circuit 51 from the battery 61, the capacitor 82 discharges the stored charge to compensate for the power shortage.

As illustrated in FIG. 4, the pre-charge circuit 52 includes an FET drive circuit 83, an FET 84, and a resistor 85 for suppressing inrush current. The FET 84 and the resistor 85 are provided on the power supply line 65. The FET 84 is on a drive circuit 51 (load) side, while the resistor 85 is on a battery 61 (power supply) side. The FET drive circuit 83 drives the FET 84 in accordance with a command from the microcomputer 54. As the FET 84 is turned on and off, electrical continuity of the power supply line 65 is switched on and off.

As indicated by a long dashed short dashed line in FIG. 3, when the pre-charge circuit 52 (the FET 84) is turned on with the power supply relay 53 off, power of the battery 61 is supplied to the drive circuit 51 through an electrical path L1 that includes (the resistor 85 and the FET 84 of) the pre-charge circuit 52. Power of the battery 61 is supplied to the capacitor 82 when each of the switching devices of the drive circuit 51 is off. As a result, the capacitor 82 is charged. As indicated by a dashed line in FIG. 3, when the power supply relay 53 is turned on with (the FET 84 of) the pre-charge circuit 52 off, power of the battery 61 is supplied to the drive circuit 51 through an electrical path L2 that includes the power supply relay 53.

The microcomputer 54 calculates a target assist torque to be produced by the motor 31 based on the steering torque τ detected through the torque sensor 42 and the vehicle speed V detected through the vehicle speed sensor 41, and calculates a current command value in accordance with the calculated target assist torque. The current command value is a target value of current to be supplied to the motor 31 so that the target assist torque of an appropriate magnitude is produced in accordance with the steering torque τ and the vehicle speed V. The microcomputer 54 calculates the current command value to have an absolute value that increases as an absolute value of the steering torque τ increases and the vehicle speed V becomes lower.

The microcomputer 54 generates the command signal $S_c$ (PWM signal) for the drive circuit 51 by performing current feedback control that causes an actual value of current supplied to the motor 31 to follow the current command value. The command signal $S_c$ defines a duty ratio of each switching device of the drive circuit 51. The duty ratio means a ratio of an on period of the switching device to a pulse cycle. The microcomputer 54 controls power supply to the motor 31 using the rotation angle $\theta_m$ of the motor 31 detected through the rotation angle sensor 43. Electric current is supplied to the motor 31 in accordance with the command signal $S_c$ through the drive circuit 51, causing the motor 31 to produce a torque in accordance with the current command value.

Figure 5:
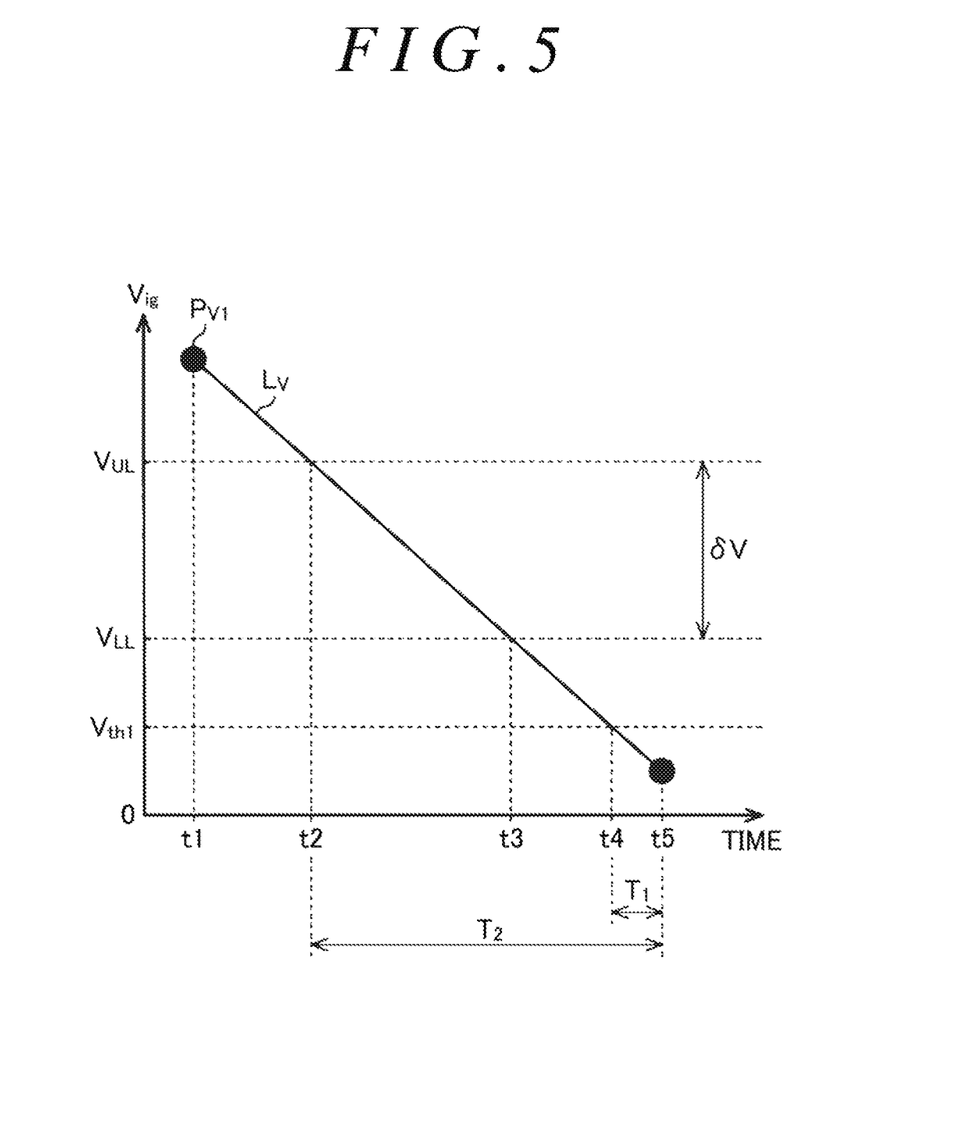
FIG. 5 is a graph illustrating an operating voltage range of a microcomputer according to the first embodiment.

As indicated in a graph of FIG. 5, an operating voltage range δV is set for the microcomputer 54. The operating voltage range δV is a range of voltage within which the microcomputer 54 is guaranteed to operate in specifications. The microcomputer 54 starts operating when the voltage $V_{ig}$ (power supply voltage) detected through the voltage sensor 71 has entered the operating voltage range δV. The microcomputer 54 does not operate when the voltage $V_{ig}$ detected through the voltage sensor 71 is above the operating voltage range δV.

The operating voltage range δV is set as a range from a lower limit voltage $V_{LL}$ to an upper limit voltage $V_{UL}$, both inclusive. The lower limit voltage $V_{LL}$ is set to a value larger than a first voltage determination threshold $V_{th1}$. The first voltage determination threshold $V_{th1}$ is a voltage used by the microcomputer 54 as a reference when recognizing that the power switch 63 is turned off. The first voltage determination threshold $V_{th1}$ is set to 0 (zero) or a value close to 0.

The microcomputer 54 recognizes that the power switch 63 is turned off when a state where the voltage $V_{ig}$ detected through the voltage sensor 71 is below the first voltage determination threshold $V_{th1}$ continues for a preset period $T_1$. The reason for this is to reduce false determination that would otherwise be made by the microcomputer 54 by falsely determining that, when the voltage $V_{ig}$ instantaneously drops below the first voltage determination threshold $V_{th1}$, the power switch 63 is turned off based on the drop.

When power is turned on or, more specifically, when the voltage $V_{ig}$ detected through the voltage sensor 71 has entered the operating voltage range δV, the microcomputer 54 starts what is generally referred to as initial check. The initial check is a check (inspection) prior to starting power supply to the motor 31 and is inspection for anomalies in parts for driving the motor 31, such as the power supply relay 53, windings of the motor 31, and the drive circuit 51.

A procedure to be performed by the microcomputer 54 when power is turned on is described below. Each of the pre-charge circuit 52, the power supply relay 53, and (the switching devices of) the drive circuit 51 is in its off state.

Figure 6:
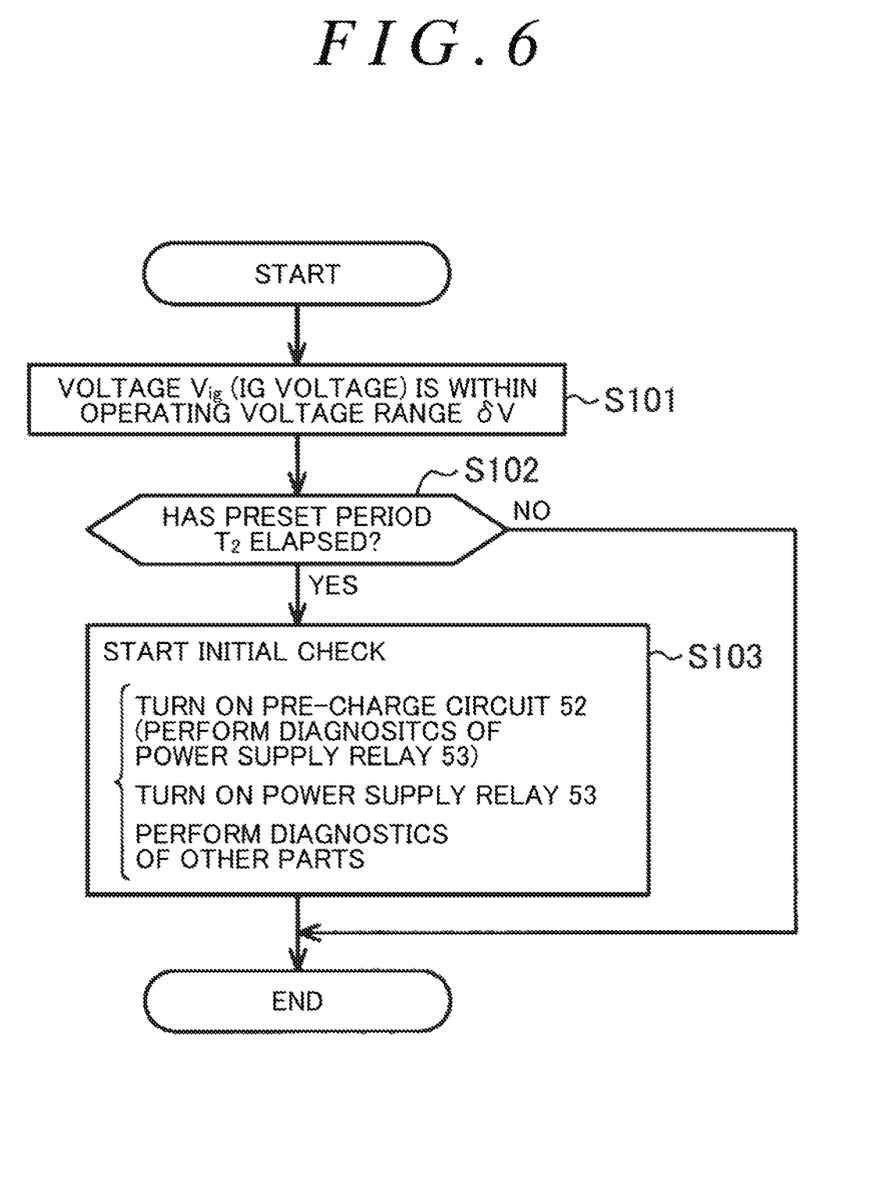
FIG. 6 is a flowchart illustrating a procedure to be performed by the microcomputer according to the first embodiment.

As illustrated in a flowchart of FIG. 6, when the voltage $V_{ig}$ (IG voltage) detected through the voltage sensor 71 has entered the operating voltage range δV from outside the operating voltage range δV (step S101), the microcomputer 54 determines whether a preset period $T_2$ has elapsed from when the voltage $V_{ig}$ has entered the operating voltage range δV (step S102). The microcomputer 54 measures a period of time elapsed from when the voltage $V_{ig}$ has entered the operating voltage range δV through a counter 54a. The preset period $T_2$ is obtained by experiment or simulation. The preset period $T_2$ is set with reference to a period of time over which the voltage $V_{ig}$, with the power switch 63 off, decreases from the upper limit voltage $V_{UL}$ of the operating voltage range δV to a value (e.g., 0 V or a value close to 0 V) below the operating voltage range δV. In the first embodiment, as illustrated in the graph of FIG. 5, the preset period $T_2$ is set so as to elapse concurrently at the time (time t5) when the preset period $T_1$ for use in determining whether the power switch 63 is off elapses. When lapse of the preset period $T_2$ is measured through the counter 54a, the microcomputer 54 clears (resets) the counter 54a.

When it is not determined that the preset period $T_2$ has elapsed from when the voltage $V_{ig}$ has entered the operating voltage range δV (step S102: NO), the microcomputer 54 completes processing without carrying out the initial check. When it is determined that the preset period $T_2$ has elapsed from when the voltage $V_{ig}$ has entered the operating voltage range δV (step S102: YES), the microcomputer 54 starts the initial check (step S103).

The microcomputer 54 starts the initial check such that the microcomputer 54 turns on the pre-charge circuit 52 when a difference between the voltage $V_{pig1}$ detected through the voltage sensor 72 and the voltage $V_{pig2}$ detected through the voltage sensor 73 is above a second voltage determination threshold $V_{th2}$ as indicated by an expression (A1) below. This causes DC power of the battery 61 to be supplied to the drive circuit 51 via the pre-charge circuit 52. Because each switching device of the drive circuit 51 is held in its off state at this time, the DC power of the battery 61 is supplied to capacitor 82. The capacitor 82 is supplied with the DC power from the battery 61 and accordingly charged.

The second voltage determination threshold $V_{th2}$ is set with reference to the difference (=$|V_{pig1}-V_{pig2}|$) in voltage across the power supply relay 53, which does not cause inrush current into the capacitor 82 from the battery 61 when the power supply relay 53 is turned on.

$$|V_{pig1}-V_{pig2}|>V_{th2} \tag{A1}$$

When the difference between the voltage $V_{pig1}$ detected through the voltage sensor 72 and the voltage $V_{pig2}$ detected through the voltage sensor 73 drops to or below the second voltage determination threshold $V_{th2}$ as indicated by an expression (A2) below, the microcomputer 54 recognizes that charging of the capacitor 82 is completed, and accordingly turns off the pre-charge circuit 52 and then turns on the power supply relay 53. This causes power of the battery 61 to be supplied to the drive circuit 51. At this time, inrush current into the capacitor 82 from the battery 61 does not occur because charging of the capacitor 82 is completed.

$$|V_{pig1}-V_{pig2}|\le V_{th2} \tag{A2}$$

Before turning on the power supply relay 53, the microcomputer 54 may carry out diagnostics of determining whether there is sticking in the power supply relay 53 as a part of the initial check. When there is sticking in the power supply relay 53, the voltage $V_{pig2}$ on the load side of the power supply relay 53 is brought to the same level as the voltage (power supply voltage) of the battery 61 via the power supply relay 53. Hence, whether there is sticking on the power supply relay 53 is detectable based on the voltage $V_{pig2}$ on the load side of the power supply relay 53. The microcomputer 54 turns on the power supply relay 53 when no anomaly is detected in the power supply relay 53.

After tuning on the power supply relay 53, the microcomputer 54 carries out diagnostics of parts (e.g., the drive circuit 51) other than the power supply relay 53 and then completes processing. After the initial check is completed normally, the microcomputer 54 performs assist control that supplies power to the motor 31 in accordance with a steering state.

Operations performed by the microcomputer 54 when power is turned on through the procedure illustrated in the flowchart of FIG. 6 are described below.

A situation where a voltage drop of the battery 61, for example, makes it difficult to supply required power to an electrical load, such as a starter for starting an engine, may occur. Under such a situation, what is generally referred to as jump start that starts the engine of a disabled vehicle by supplying power from a battery mounted in a rescue vehicle may be performed.

To perform jump start, the battery 61 of the disabled vehicle is connected to the battery of the rescue vehicle. As a result, as indicated by a point $P_{V1}$ in the graph of FIG. 5, the voltage $V_{ig}$ detected through the voltage sensor 71, i.e., the power supply voltage of the microcomputer 54, may be held in an overvoltage condition where the power supply voltage is above the operating voltage range δV (time t1). For example, when the power switch 63 is turned off under the overvoltage condition indicated by the point $P_{V1}$ after the engine is started by jump start, the voltage $V_{ig}$ changes as follows.

Electrical continuity of the power supply line 62 between the battery 61 and the microcomputer 54 is shut off by turning off the power switch 63. As indicated by a characteristic line $L_V$ in the graph of FIG. 5, the voltage $V_{ig}$ (power supply voltage) gradually decreases to the upper limit voltage $V_{UL}$ of the operating voltage range δV (time t2). Thereafter, the voltage $V_{ig}$ further decreases to the lower limit voltage $V_{LL}$ (time t3). The voltage $V_{ig}$ subsequently continues decreasing and eventually reaches the first voltage determination threshold $V_{th1}$ (time t4).

As described above, when the power switch 63 is turned off under the overvoltage condition, the voltage $V_{ig}$ stays within the operating voltage range δV by which an initial check start condition is satisfied, although for only a slight period of time (period from time t2 to time t3).

The microcomputer 54 recognizes that the power switch 63 is turned off when the preset period $T_1$ has elapsed (time t5) from when the voltage $V_{ig}$ has dropped below the first voltage determination threshold $V_{th1}$. There is some time lag from when the power switch 63 is actually turned off at time t1 to when the microcomputer 54 actually recognizes that the power switch 63 is turned off at time t5. The microcomputer 54 recognizes that the voltage $V_{ig}$ has entered the operating voltage range δV earlier than recognizing that the power switch 63 is turned off. The microcomputer 54 then accordingly starts the initial check immediately. However, in this case, the following disadvantage may arise.

The microcomputer 54 carries out the initial check such that the microcomputer 54 turns on the pre-charge circuit 52 and, when triggered by completion of charging of the capacitor 82, turns on the power supply relay 53. This causes power from the battery 61 to be supplied to a circuit downstream of the power supply relay 53. At this time, because the battery 61 is connected to the battery of the rescue vehicle and therefore held in the overvoltage condition, a voltage above durable power of the pre-charge circuit 52 may be applied to the pre-charge circuit 52, more specifically, to the FET 84 of the pre-charge circuit 52.

However, according to the first embodiment, when the preset period $T_2$ has elapsed (step S102 of FIG. 6: YES) from when the voltage $V_{ig}$ has entered the operating voltage range δV from the outside the operating voltage range δV, the microcomputer 54 starts the initial check.

The preset period $T_2$ is set with reference to the period of time over which the voltage $V_{ig}$ decreases from the upper limit voltage $V_{UL}$ of the operating voltage range δV to a value below the operating voltage range δV, with the power switch 63 off. Hence, as indicated by the characteristic line $L_V$ in the graph of FIG. 5, in a situation where the power switch 63 is turned off under the overvoltage condition where the voltage $V_{ig}$ is above the operating voltage range δV, when the preset period $T_2$ has elapses (time t5) from the time when the voltage $V_{ig}$ has decreased to the upper limit voltage $V_{UL}$ of the operating voltage range δV (time t2), the voltage $V_{ig}$ has decreased to a value below the operating voltage range δV. According to the first embodiment, the time when the microcomputer 54 recognizes that the power switch 63 is turned off is also the time when the preset period $T_2$ has elapsed from the time when the voltage $V_{ig}$ has decreased to the upper limit voltage $V_{UL}$ of the operating voltage range δV.

Because the microcomputer 54 does not determine that the voltage $V_{ig}$ has entered the operating voltage range δV, the microcomputer 54 does not carry out the initial check. Furthermore, according to the first embodiment, the microcomputer 54 also recognizes that the power switch 63 is turned off. This also causes the microcomputer 54 not to carry out the initial check. Because the FET 84 of the pre-charge circuit 52 is not turned on, application of an overvoltage above the operating voltage range δV to the FET 84 of the pre-charge circuit 52 does not occur. This allows protecting the FET 84, which leads to protecting the pre-charge circuit 52.

The microcomputer 54 performs the procedure illustrated in the flowchart of FIG. 6 also when power is turned on under a normal condition. More specifically, the microcomputer 54 starts the initial check when the voltage $V_{ig}$ has entered the operating voltage range δV from the outside the operating voltage range δV (in this example, a value below the operating voltage range δV) (step S101) and the preset period $T_2$ has elapsed (step S102: YES). If power is turned on under a normal condition, even after the preset period $T_2$ has elapsed from when the voltage $V_{ig}$ has entered the operating voltage range δV, the voltage $V_{ig}$ is basically held within the operating voltage range δV.

The first embodiment provides the following advantages.

(1) The microcomputer 54 starts the initial check after the preset period $T_2$ has elapsed from when the voltage $V_{ig}$ detected through the voltage sensor 71 has entered the operating voltage range δV. Hence, even when the power switch 63 is turned off under an overvoltage condition where the voltage $V_{ig}$ is above the operating voltage range δV, which may occur when jump start is performed, and, as a result, the voltage $V_{ig}$ temporarily (instantaneously) enters the operating voltage range δV, the microcomputer 54 does not start the initial check immediately. Because an overvoltage is not applied to the pre-charge circuit 52, occurrence of an anomaly in the pre-charge circuit 52, more specifically, in the FET 84 that is an element of the pre-charge circuit 52, can be reduced. Protecting the pre-charge circuit 52 from overvoltage is thus achieved.

(2) Meanwhile, a high power durable FET may be employed as the FET 84 of the pre-charge circuit 52. However, such a high power durable FET is typically expensive and larger in size. According to the first embodiment, protecting the pre-charge circuit 52 is achieved by devising a condition to turn on the pre-charge circuit 52 rather than by changing the configuration of the ECU 40 or by adding a new element to the ECU 40. This leads to reduction in increases in product cost and product size of the ECU 40.

Figure 7:
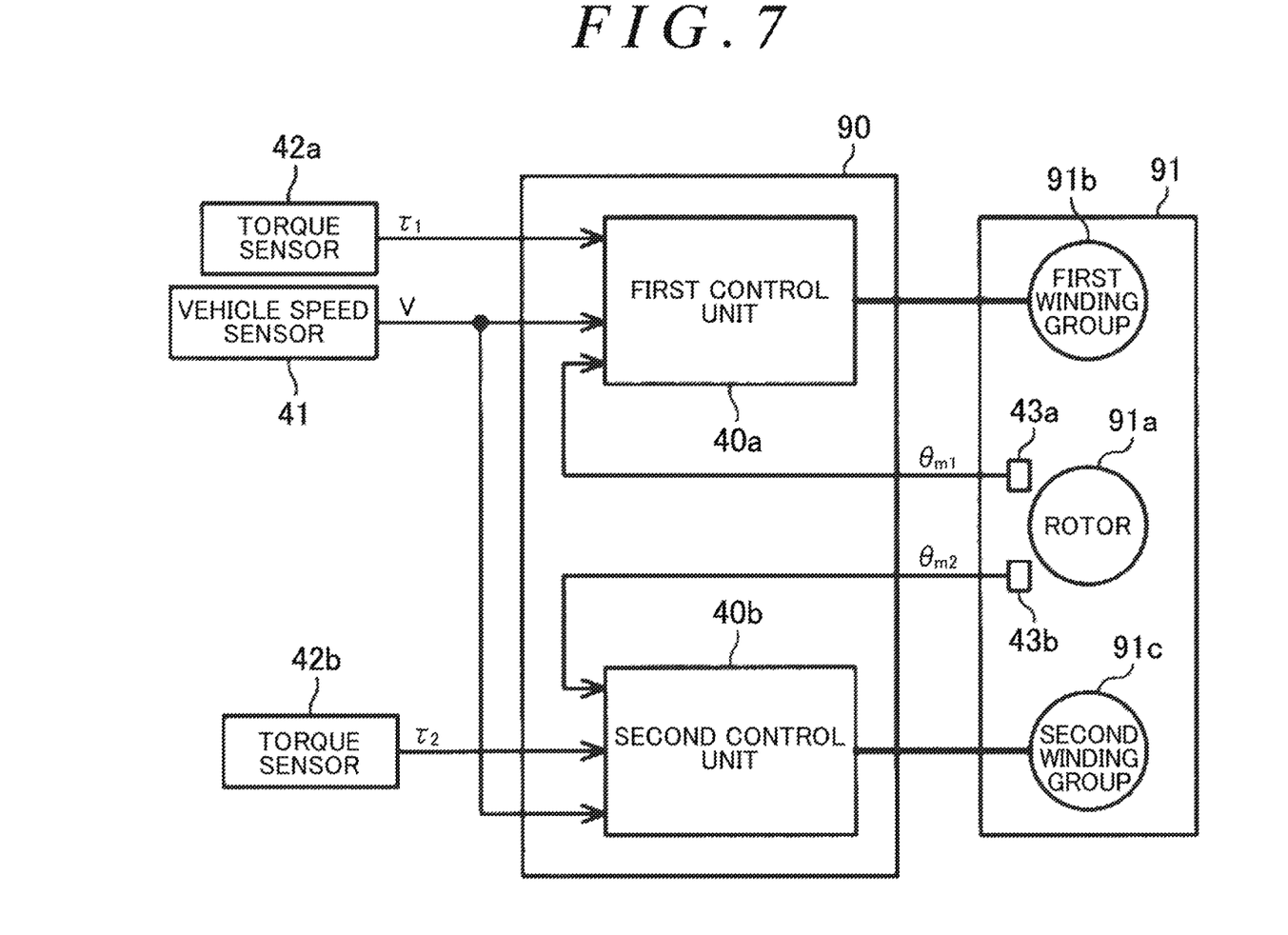
FIG. 7 is a block diagram illustrating an ECU according to a second embodiment.

A vehicle control apparatus according to a second embodiment is described below. As illustrated in FIG. 7, an ECU 90 controls power supply to a motor 91 including two winding systems, a first winding system and a second winding system. The motor 91 includes a rotor 91a, and a first winding group 91b and a second winding group 91c wound around stators (not illustrated). The first winding group 91b includes a U-phase coil, a V-phase coil, and a W-phase coil. The second winding group 91c includes a U-phase coil, a V-phase coil, and a W-phase coil as well.

The motor 91 includes two rotation angle sensors 43a and 43b that are vehicle-mounted sensors. The rotation angle sensors 43a and 43b detect rotation angles $θ_{m1}$ and $θ_{m2}$, respectively, of the motor 91. Two torque sensors 42a and 42b that are vehicle-mounted sensors are provided on the column shaft 22a, for example. The torque sensors 42a and 42b detect steering torques $τ_1$ and $τ_2$, respectively, applied to the steering shaft 22.

The ECU 90 controls power supply to the first winding group 91b and the second winding group 91c individually on a per-winding-system basis. The ECU 90 includes a first control unit 40a that controls power supply to the first winding group 91b and a second control unit 40b that controls power supply to the second winding group 91c. Each of the first control unit 40a and the second control unit 40b is basically identical in configuration to the ECU 40 illustrated in FIG. 2. The first control unit 40a controls power supply to the first winding group 91b based on the steering torques $τ_1$, the vehicle speed V, and the rotation angle $θ_{m1}$ of the motor 91. The second control unit 40b controls power supply to the second winding group 91c based on the steering torques $τ_2$, the vehicle speed V, and the rotation angle $θ_{m2}$ of the motor 91.

When power is turned on, the ECU 90 carries out the initial check individually on a per-winding-system basis. When power is turned on, the first control unit 40a starts the initial check of the first winding system to which the first control unit 40*a* belongs by performing the procedure illustrated in the flowchart of FIG. 6. When power is turned on, the second control unit 40*b* starts the initial check of the second winding system to which the second control unit 40*b* belongs by performing the procedure illustrated in the flowchart of FIG. 6 as well.

The ECU 90 may control a motor including three or more winding systems each including a winding group. Also in this case, the ECU 90 controls power supply to the winding groups of the three or more winding systems independently. In this case, the ECU 90 may be configured to include individual control units corresponding to each of the winding systems.

According to the second embodiment, the following advantage is obtained in addition to the advantages (1) and (2) of the first embodiment. (3) When an anomaly occurs in any one of the two winding systems, power is supplied to the winding group of the remaining normal winding system to continue driving the motor 91.

The first and second embodiments may be modified as follows. In the first and second embodiments, a battery of an appropriate voltage, e.g., 12 V, 24 V, or 36 V, may be employed as the battery 61 in accordance with specifications of the vehicle.

The first and second embodiments describe an example in which an EPS that transmits a torque of the motor (31, 91) to (the column shaft 22*a* of) the steering shaft 22 is employed as the EPS 10. Alternatively, an EPS that transmits a torque of the motor (31, 91) to the rack shaft 23 may be employed as the EPS 10.

In the first and second embodiments, the vehicle control apparatus is embodied as the ECU (40, 90) that controls the motor (31, 91) of the EPS 10. Alternatively, the vehicle control apparatus may be embodied as a control apparatus for a steer-by-wire steering system in which power transmission between the steering wheel 21 and the steered wheels 26, 26 is separated. Such a steer-by-wire steering system typically includes a reactive motor that is a source of a steering reaction force applied to a steering shaft and a steering operation motor that is a source of a steering operation force that turns steered wheels. The control apparatus for the steer-by-wire steering system controls each of the reactive motor and the steering operation motor.

In the first and second embodiments, the vehicle control apparatus is embodied as the ECU (40, 90) that controls the motor (31, 91) of the EPS 10. Alternatively, the vehicle control apparatus may be embodied as a control apparatus of a motor used in vehicle-mounted equipment other than a steering system, such as the EPS 10.

What is claimed is:

1. A vehicle control apparatus comprising:
   a drive circuit that supplies driving power based on a power supply voltage to a motor;
   a capacitor for power supply stabilization, the capacitor being connected in parallel with the drive circuit;
   a control circuit that controls an operation of the drive circuit;
   a power switch that opens and closes a first power supply path that connects between the control circuit and a power supply;
   a power supply relay that opens and closes a second power supply path that connects between the drive circuit and the power supply; and
   a pre-charge circuit that opens and closes a third power supply path that connects between the drive circuit and the power supply, wherein after a lapse of a first preset period from when a voltage supplied through the first power supply path has entered an operating voltage range due to turning on or off of the power switch, the control circuit starts charging the capacitor by turning on the pre-charge circuit, and then, when the charging of the capacitor is completed, turns on the power supply relay, and
   the first preset period is set with reference to a period of time over which the voltage on the first power supply path decreases from an upper limit voltage of the operating voltage range to a value below the operating voltage range, with the power switch off.

2. The vehicle control apparatus according to claim 1, wherein
   the control circuit recognizes that the power switch is turned off when a second preset period has elapsed from when the voltage on the first power supply path has dropped below a first voltage determination threshold that is set to a value below the operating voltage range, and
   the first preset period is set so as to elapse concurrently when the second preset period elapses.

3. The vehicle control apparatus according to claim 1, wherein the control circuit determines that the charging of the capacitor is completed when a difference in voltage across the power switch is equal to or below a second voltage determination threshold that is set with reference to a value that does not cause inrush current into the capacitor when the power supply relay is turned on.

4. The vehicle control apparatus according to claim 1, wherein when the charging of the capacitor is completed, the control circuit carries out diagnostics of the power supply relay as a part of an initial check that is a check prior to starting power supply to the motor, and turns on the power supply relay when a result of the diagnostics indicates no anomaly.

5. The vehicle control apparatus according to claim 1, wherein the motor produces a torque to be applied to a steering mechanism of a vehicle.

* * * * *